(12) United States Patent
Mercea et al.

(10) Patent No.: US 9,280,214 B2
(45) Date of Patent: Mar. 8, 2016

(54) METHOD AND APPARATUS FOR MOTION SENSING OF A HANDHELD DEVICE RELATIVE TO A STYLUS

(71) Applicant: Research In Motion Limited, Waterloo (CA)

(72) Inventors: Cornel Mercea, Waterloo (CA); Andrew Ashraf Fergusson, St. Clements (CA); Jacek S. Idzik, Kenilworth (CA)

(73) Assignee: BlackBerry Limited, Waterloo, Ontario (CA)

( * ) Notice: Subject to any disclaimer, the term of this patent is extended or adjusted under 35 U.S.C. 154(b) by 124 days.

(21) Appl. No.: 13/933,476

(22) Filed: Jul. 2, 2013

(65) Prior Publication Data

US 2015/0009187 A1  Jan. 8, 2015

(51) Int. Cl.
  *G06F 3/0346* (2013.01)
  *G06F 3/0354* (2013.01)

(52) U.S. Cl.
  CPC .......... *G06F 3/03545* (2013.01); *G06F 3/0346* (2013.01)

(58) Field of Classification Search
  CPC .............................. G06F 3/0346; G06F 3/0383
  USPC ......................................................... 345/474
  See application file for complete search history.

(56) References Cited

U.S. PATENT DOCUMENTS

| | | | |
|---|---|---|---|
| 5,902,968 A | 5/1999 | Sato et al. | |
| 6,181,329 B1 | 1/2001 | Stork et al. | |
| 6,184,873 B1 | 2/2001 | Ward et al. | |
| 2002/0140666 A1 | 10/2002 | Bradski | |
| 2003/0146906 A1 | 8/2003 | Lin | |
| 2009/0191920 A1 | 7/2009 | Regen et al. | |
| 2009/0239591 A1 | 9/2009 | Alameh et al. | |
| 2011/0304537 A1 | 12/2011 | Eruchimovitch et al. | |
| 2012/0127110 A1 | 5/2012 | Amm et al. | |
| 2013/0257777 A1* | 10/2013 | Benko et al. | 345/173 |

FOREIGN PATENT DOCUMENTS

WO   WO2009/118054   10/2009

OTHER PUBLICATIONS

European Patent Office, Extended European Search Report, EP 13 17 4804.8, Jul. 7, 2014.

(Continued)

*Primary Examiner* — Amare Mengistu
*Assistant Examiner* — Shawna Stepp Jones
(74) *Attorney, Agent, or Firm* — Thomas Grzesik; Fleit Gibbons Gutman Bongini & Bianco P.L.

(57) ABSTRACT

A handheld device and method of operation for determining motion of the handheld device relative to a stylus is presented, in which the stylus is used to provide a frame of reference for the handheld device rather than as a user input device. Stylus orientation data, descriptive of an absolute orientation of a stylus, and handheld device orientation data, descriptive of an absolute orientation of the handheld device, are used to determine motion of the handheld device relative to the stylus. The handheld device has orientation and/or motion sensors, a communication module operable to receive stylus orientation data, and a processor operable to determine the motion or orientation of the handheld device relative to the stylus and execute an application dependent thereon.

19 Claims, 4 Drawing Sheets

(56) References Cited

OTHER PUBLICATIONS www.erickroby.com/stylus2pt0.html, downloaded from the internet Jul. 1, 2013.

Blasko et al., "Workplane-orientation sensing techniques for Tablet PCs", UIST '04, Oct. 24-27, 2004, Santa FE, NM ACM1-58113962-4/04/0010.

* cited by examiner

METHOD AND APPARATUS FOR MOTION SENSING OF A HANDHELD DEVICE RELATIVE TO A STYLUS

BACKGROUND

A stylus is commonly used to identify positions on a touch screen or other sensing surface of a host electronic device so as to provide user input to the device. In addition, the tilt of a stylus relative to the Earth's gravitational field may be sensed to provide additional user input to the host device. Still further, the tilt of a stylus relative to a stationary sensing surface may be sensed.

A handheld host device, such as gaming controller, tablet computer or 'smart' mobile telephone, may incorporate motion sensors such as accelerometers or gyroscopes. These motion sensors provide information related to dynamic motion of the handheld host device relative to the Earth. The information may be used, for example, to control remote or local software applications.

When a user of a handheld host device is in motion, such as while walking or when using transportation, any such motion of the user that is detected by the motion sensor of the device may cause unintended inputs to the device. It would therefore be desirable to provide a method and apparatus to eliminate, or reduce, unintended inputs to the host device when a user is in motion.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1A:
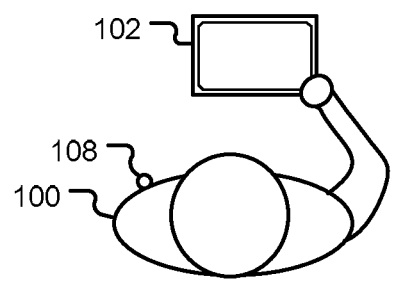
FIGS. 1A-1C shows diagrammatic representations of a user and a handheld device in various orientations.

For simplicity and clarity of illustration, reference numerals may be repeated among the figures to indicate corresponding or analogous elements. Numerous details are set forth to provide an understanding of the illustrative embodiments described herein. The exemplary embodiments may be practiced without these details. In other instances, well-known methods, procedures, and components have not been described in detail to avoid obscuring the disclosed embodiments. The description is not to be considered as limited to the scope of the embodiments shown and described herein.

A handheld device, such as gaming controller, tablet computer or 'smart' mobile telephone, may incorporate motion sensors, such as accelerometers or gyroscopes. These motion sensors provide information related to dynamic motion of the handheld host device relative to the Earth. The information may be used, for example, to control software applications executed on the device or on a remote device. For example, tilt information from an accelerometer may be used by software applications executed on the device to ensure that an image displayed on a screen of the device maintains an approximately vertical orientation.

One aspect of the disclosure relates to a handheld device and method of operation for determining motion of the handheld device relative to a stylus, in which the stylus is used to provide a frame of reference for the handheld device rather than as a user input device. Stylus orientation data, descriptive of an absolute orientation of a stylus, and handheld device orientation data, descriptive of an absolute orientation of the handheld device, are used to determine motion of the handheld device relative to the stylus. The handheld device has orientation and/or motion sensors, a communication module operable to receive stylus orientation data, and a processor operable to determine the motion or orientation of the handheld device relative to the stylus and execute an application dependent thereon.

Figure 1B:
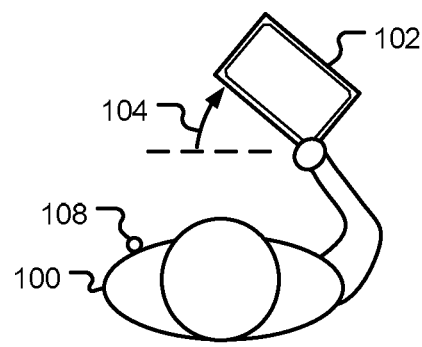
Figure 1C:
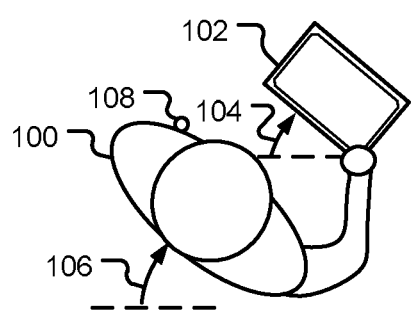

FIGS. 1A-1C show diagrammatic representations of a user 100 and a handheld device 102 in various orientations and viewed looking down from above. The handheld device may be, for example, a gaming controller, tablet computer, personal digital assistant, 'smart' mobile telephone, or the like. FIG. 1A shows an initial configuration. FIG. 1B shows a configuration where the orientation of the user 100 is unchanged but the handheld device 102 has been rotated through an angle 104 from the initial orientation. FIG. 1C shows a configuration where, relative to the initial positions shown in FIG. 1A, the user 100 has been rotated through an angle 106 and the handheld device 102 has been rotated through an angle 104. Rotation of the user may be due to the user turning to look or walk in a different direction, for example, or due to turning of a vehicle, such as an automobile, in which the user is travelling.

In this example, the angles 104 and 106 are approximately equal. In FIG. 1B the handheld device 102 has been rotated relative to the user 100, whereas in FIG. 1C, the handheld device 102 has not been rotated relative to the user 100. Prior orientation sensing techniques that rely on sensing motion of the handheld device are unable to distinguish between the situations shown in FIGS. 1B and 1C. In prior techniques, the motion and orientation of the handheld device is measured relative to the Earth. An aspect of the present disclosure enables the motion or orientation of a handheld device to be determined relative to a moving frame of reference, such as a user or a vehicle, rather than relative to the absolute frame of reference of the Earth.

In accordance with an exemplary embodiment, a stylus 108 (shown in FIGS. 1A-1C) is provided that has orientation sensing or motion sensing capabilities, or both. To enable motion of the handheld device to be determined relative to the user 100, the stylus is positioned on the body of the user as shown in FIGS. 1A-1C (in a pocket, for example) or positioned to move with a vehicle in which the user is traveling. For example, the stylus could be placed on the dashboard of an automobile or in a storage compartment of the automobile. Information representative of the orientation or motion of the stylus is communicated to the handheld device, where it may be used to determine the orientation and/or motion of the handheld device relative to the stylus and, therefore, relative to the user or vehicle. Thus, rather than being used as a conventional hand-held input device, the stylus is used to provide a frame reference with respect to which motion and/or orientation of the handheld device (such as a tablet computer) is determined. Motion and/or orientation of the handheld device, relative the frame of reference provided by the stylus, is used to provide input to software applications executed on the device.

Another aspect of the present disclosure relates to a handheld device and a method executed on the handheld device for determining motion of a handheld device relative to a stylus. In an exemplary embodiment, stylus orientation data, descriptive of an absolute orientation of the stylus, is received from the stylus. Handheld device orientation data, descriptive of an absolute orientation of the handheld device, is determined dependent upon signals from sensors of the handheld device. The motion of the handheld device relative to the stylus is determined dependent upon the stylus orientation data and the handheld device orientation data.

The handheld device orientation data may be determined dependent upon signals from one or more of: an accelerometer, a gyroscope and a magnetic field sensor of the handheld device.

Similarly, the stylus orientation data may be determined dependent upon signals from one or more of: an accelerometer, a gyroscope and a magnetic field sensor of the stylus.

The sensors may include micro-machined electro-mechanical systems (MEMS), for example. Multiple sensors may be integrated into a single chip or package. For example, a 3-axis accelerometer, a 3-axis gyroscope, and a 3-axis magnetic field sensor may be integrated in a single package.

Local motion of the handheld device may be sensed to provide local motion data descriptive of handheld device motion in a frame of reference of the handheld device. In this embodiment, motion of the handheld device relative to the stylus is determined dependent upon this local motion data.

The motion of the handheld device relative to the stylus may be determined by determining a relative orientation between the handheld device and the stylus dependent upon the stylus orientation data and the handheld device orientation data and rotating the local motion data dependent upon the relative orientation between the handheld device and the stylus.

A software application executed on the handheld device may be controlled dependent upon the motion of the handheld device relative to the stylus. Optionally, the software application executed on the handheld device may be controlled dependent upon the motion of the handheld device relative to the Earth. The user may select via a user interface whether absolute or relative motion, or both, are to be used.

Figure 2:
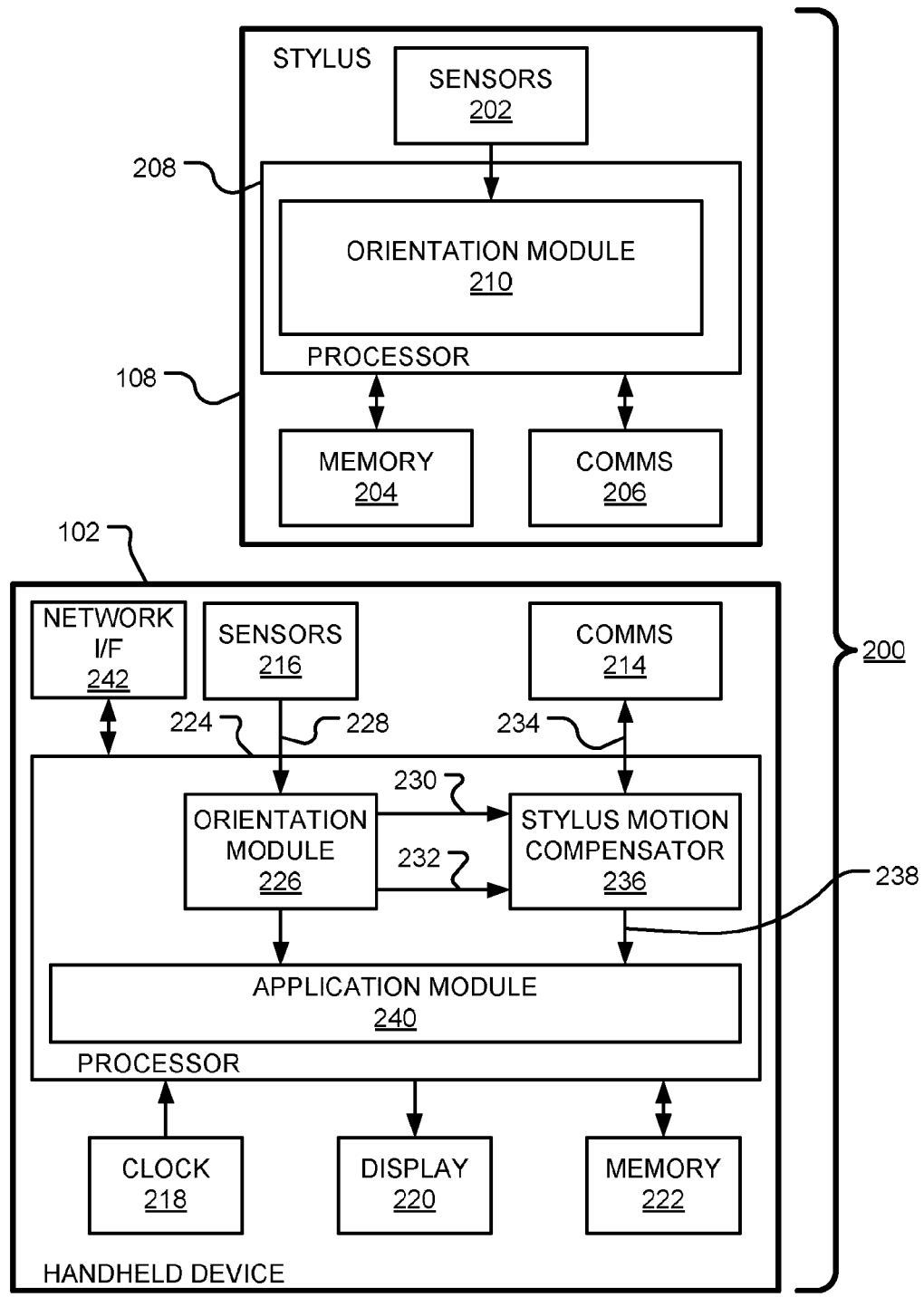
FIG. 2 is a block diagram of a system for determining motion of a handheld device relative to a user, in accordance with exemplary embodiments of the present disclosure.

FIG. 2 is a block diagram of a system 200 for determining motion of a handheld device relative to a user, in accordance with exemplary embodiments of the present disclosure. The system 200 comprises a handheld device 102 and a stylus 108. The stylus 108 includes motion and/or orientation sensors 202, memory 204 and communication sub-system 206, all of which are operationally coupled to a processor 208. The processor 208 implements an orientation module 210 that is operable to determine the orientation of the stylus 108 relative to the Earth. Signals characterizing the orientation of the stylus are passed to the communication sub-system 206, where they are transmitted. The motion and/or orientation sensors 202 may include, for example, accelerometers for tilt sensing, gyroscopes for rotational motion sensing and magnetic field sensors for sensing orientation relative to the Earth's magnetic field.

The sensors (202) may include orientation sensors, such as a compass or a tilt sensor that provide direct measurement of orientation even if the device is stationary. The sensors (202) may include motion sensors, such as a gyroscope or accelerometer, from which a change in orientation can be calculated. The motion sensor signals may be processed to determine orientation, but additional information, such as a starting orientation, is needed. Starting orientation information may be provided by orientation sensors, or by placing the device in a known orientation, for example. An accelerometer may be responsive to both gravity and motion, providing a signal that includes both orientation and motion components.

Techniques for combining signals from some, or all, of these sensors to obtain an absolute orientation, that is, an orientation relative to an Earth frame of reference, are well known to those of skill in the art. In an embodiment, the sensors 202 and the orientation module 210 are provided in a single chip combining micro-machined sensors and processing circuitry.

In operation, the signals transmitted from the stylus 108 are received by a communication module 214 of the handheld device 102. The communication module 214, motion and/or orientation sensors 216, system clock 218, display 220 and memory 222, are all operationally coupled to a processor 224. The processor 224 implements an orientation module 226 that is operable to determine the orientation of the handheld device 102 relative to the Earth in response to signals 228 from the sensors 216. The orientation module 226 provides, as output, orientation data 230 and motion data 232. The motion data 232 may be relative to a local frame of reference or to an absolute (Earth) frame of reference. The orientation data 230 describes the orientation of the handheld device relative to the absolute (Earth) frame of reference.

Stylus orientation data 234, descriptive of the absolute orientation of the stylus, are received from the communication module 214 and are used in compensation module 236 to determine the orientation and/or motion of the handheld device 102 relative to the stylus 108. The relative motion and/or orientation 238 may be passed to an application module 240 where it provides user input to the application. Optionally, the motion and/or orientation of the handheld device relative to the absolute (Earth) frame of reference may also be passed to the application module 240. The absolute motion and/or orientation may be saved in the memory 222 or transmitted to a remote location via network interface 242.

The system clock 218 may be used to provide synchronization between the sensed motion of the handheld device and the sensed motion of the stylus. This is discussed in more detail below.

Thus, an exemplary embodiment relates to a handheld device having an orientation and/or motion sensors, a communication module operable to receive stylus orientation data from a remote stylus, the stylus orientation data descriptive of an absolute orientation of the stylus and a processor. The processor is operable to determine handheld device orientation data, descriptive of an absolute orientation of the handheld device, dependent upon signals from the orientation sensor, the motion sensor or a combination thereof, and to determine motion of the handheld device relative to the stylus, dependent upon the stylus orientation data and the handheld device orientation data. An application executed on the processor may be controlled dependent upon the motion of the handheld device relative to the stylus.

The orientation sensor may comprise a tilt sensor (such as a three-axis accelerometer), a magnetic field sensor (such as a three-axis, Hall-effect sensor), or a combination thereof. The motion sensor may comprise a three-axis accelerometer, a three-axis gyroscope, or a combination thereof. Other sensors may be used without departing from the present disclosure.

The processor may also be operable to control the application executed on the processor dependent upon an orientation of the handheld device relative to the orientation of the stylus, an orientation of the handheld device relative to an Earth frame of reference, and/or a motion of the handheld device relative to an Earth frame of reference.

Figure 3:
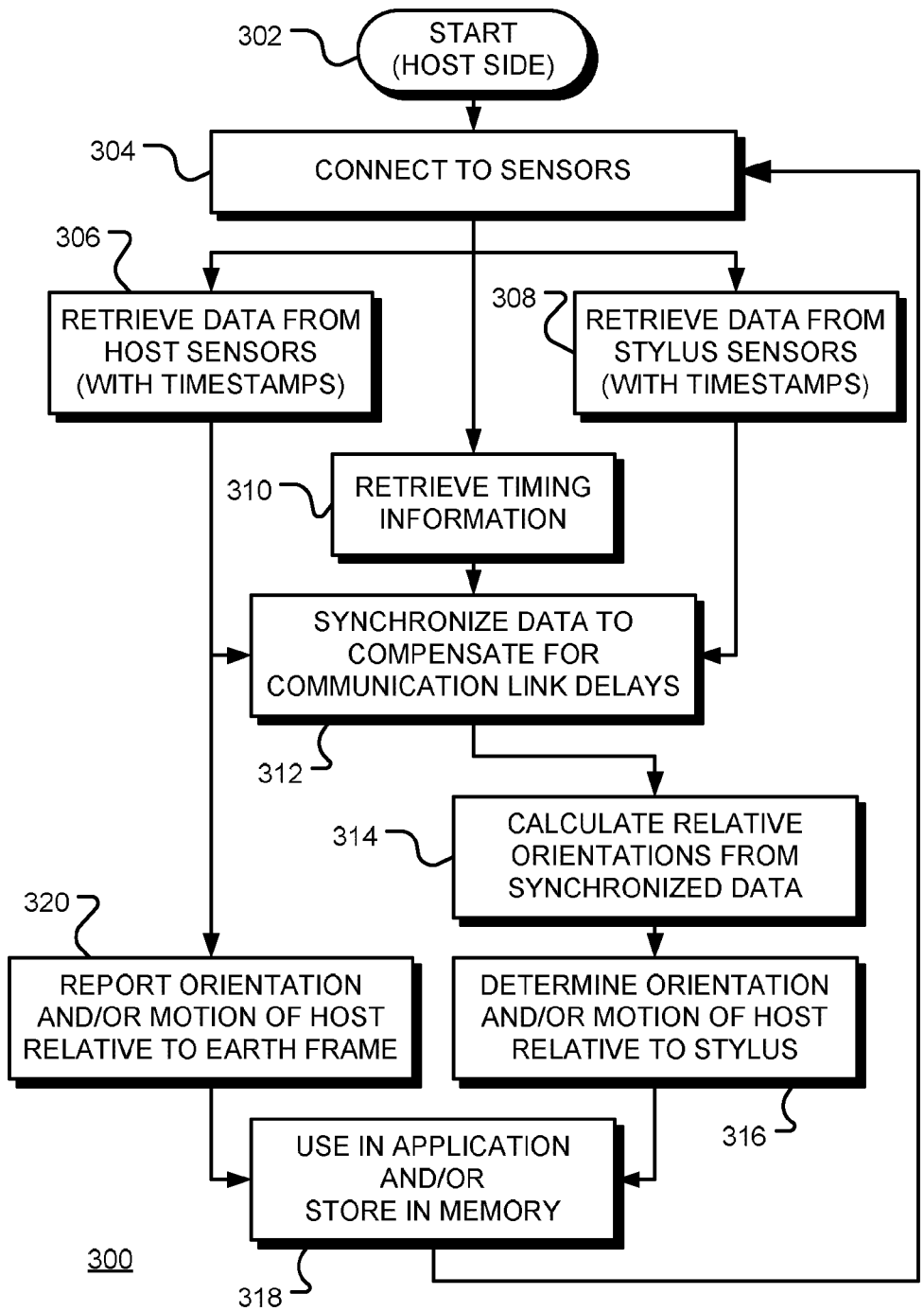
FIG. 3 is a flow chart of a method for motion sensing by a handheld electronic device, in accordance with exemplary embodiments of the present disclosure.

FIG. 3 is a flow chart 300 of a method for motion sensing by a handheld device, in accordance with some embodiments. The handheld device acts as a host device for a stylus and receives data from the stylus over a wired or wireless communication link. Following start block 302 in FIG. 3, a processor of the handheld device connects to motion and/or orientation sensors of the handheld device at block 304. At block 306 the handheld device (the host) retrieves local sensor data from these sensors. The local sensor data may comprise both orientation data (from a tilt sensor or electronic compass, for example) and motion data (from a gyroscope or accelerometer, for example). The sensors may be tri-axial sensors that provide motion or orientation vectors as output. At block 308 the handheld device receives stylus orientation data from a remote stylus. The stylus orientation data is descriptive of an absolute orientation of the stylus and may comprise explicit orientation data, or data from which the orientation may be derived.

Since the stylus orientation data is received via communication link and may comprise a serial data stream, for example, the data may not be time-aligned with the data from the local sensors of the handheld electronic device. Time misalignment may result from inherent delays when parallel data, such as a digital signal level, is serialized for transmission. In an exemplary embodiment, the stylus orientation data is time-synchronized with the local data. Synchronization may be achieved, for example, by synchronizing clocks on the stylus and handheld device and then time-stamping the stylus orientation data before it is transmitted to the handheld electronic device. The local data of the host may be similarly time-stamped to allow time synchronization. To perform time-synchronization, timing information is retrieved at block 310 and the local data and stylus orientation data are time-aligned at block 312. Other methods of synchronization will be apparent to those of ordinary skill in the art. For example, in some embodiments the time-misalignment is fixed and may be predetermined or measured. Time alignment may then be achieved by delaying the local data by a corresponding amount. At block 314, the relative orientation between the handheld device and the stylus is calculated from the synchronized stylus orientation data and handheld device orientation data. The relative orientation is used at block 316 to determine the motion of the handheld device relative to the stylus. This may be achieved, for example, by (a) representing the motion as a vector of linear or rotational motion, (b) representing the relative orientation as a rotation matrix, and (c) applying the rotation matrix to the motion vector. At block 318, the motion of the handheld device relative to the stylus is used in a software application executed on the handheld device, stored in a memory on the device and/or transmitted for use at a remote location (via a network, for example). The absolute orientation and/or motion of the electronic device relative to the frame of the Earth may also be determined at block 320 and provided to the software application.

Figure 4:
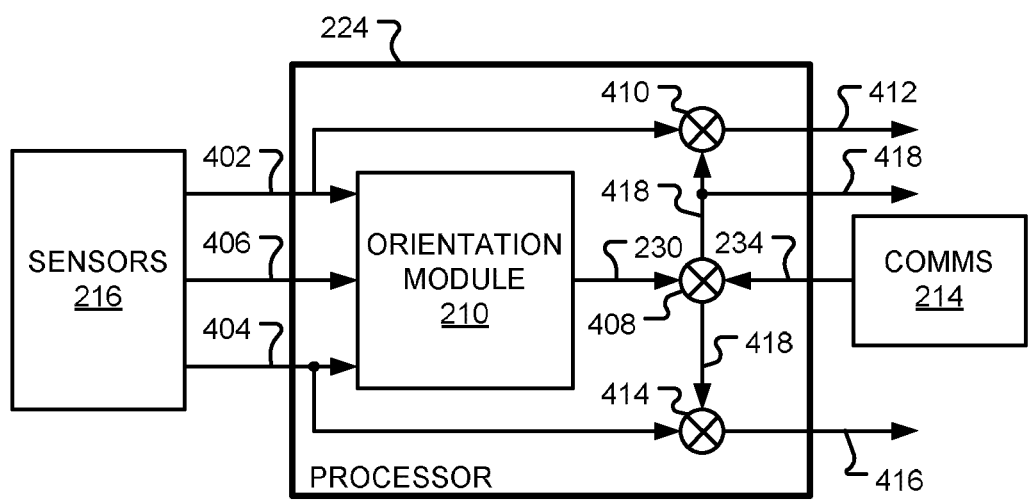
FIG. 4 is a block diagram of part of a handheld electronic device, in accordance with exemplary embodiments of the present disclosure.

FIG. 4 is a block diagram of part of a handheld electronic device, in accordance with certain embodiments of the disclosure. In the embodiment shown, an orientation module 210, which may be implemented in hardware or software or a combination thereof, receives a first signal 402, representative of linear motion and/or orientation and denoted by a vector a, such as a signal from a three-axis accelerometer, a second signal 404, representative of rotational motion and/or orientation and denoted by a vector ω, such as a signal from a three-axis gyroscope and a third signal 406, denoted by a vector n, such as a signal from an electronic compass or magnetic field sensor. The first signal 402 may include both tilt (orientation) and shake (motion) components. The signals 402, 404, 406 are provided by sensors 216 of the handheld device. The orientation module 210 is operable to determine the orientation of the handheld device relative to the Earth. This orientation is described in orientation data 230. The orientation data may take the form of a quaternion, a rotation matrix, a rotation axis and rotation angle, or some other form. Corresponding orientation data 234 from a remote stylus is received via communication sub-system 214. By way of example, it is assumed that the orientation data is expressed as a rotation matrix that represents a rotation from the Earth frame of reference to the local frame of reference. Denoting the orientation of the handheld device as $R_h$ and the orientation of the stylus as $R_s$, the linear motion vector of the handheld device relative to the stylus is computed as $$a_{relative} = R_s R_h^T a, \quad (1)$$

and a relative rotational motion vector is computed to be $$\omega_{relative} = R_s R_h^T \omega. \quad (2)$$

Similarly, a relative orientation vector of the handheld device is computed as $$n_{relative} = R_s R_h^T n. \quad (3)$$

In the above, the superposed 'T' denotes a matrix transpose. These computations are depicted in FIG. 4. The matrix $R_s R_h^T$ (denoted as signal 418), which represents the relative orientation between the stylus and the handheld device, is computed at 408 by multiplying by the matrix $R_h^T$ by the matrix $R_s$. At 410, the combined matrix $R_s R_h^T$ (418) is applied to the first signal (402), a, to obtain the linear motion and/or orientation 412 of the handheld device relative to the stylus. At 414, the combined matrix $R_s R_h^T$ is applied to the second signal (404), ω, to obtain the rotational motion 416 of the handheld device relative to the stylus. The relative motion vectors 412 and 416 may be used to control an application executed on the handheld device, may be stored in a memory, or transmitted, over a network or local wireless link, for example, to a remote device.

Optionally, the matrix $R_s R_h^T$, or another representation of the relative orientation between the stylus and the handheld device, may be output as signal 418.

These expressions assume that the orientations of the handheld device and the stylus vary slowly. More complex computations may be employed if the orientations vary more rapidly; such computations will be apparent to those of ordinary skill in the art.

It will be appreciated that any module, component or subsystem disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for determining motion of a handheld device relative to a stylus, the method comprising:
   receiving, from the stylus, stylus orientation data comprising data descriptive of an absolute orientation of the stylus;
   determining handheld device orientation data, descriptive of an absolute orientation of the handheld device, from signals from sensors of the handheld device;
   sensing local motion of the handheld device, the sensing generating local motion data descriptive of handheld device motion in a frame of reference of the handheld device;
   calculating a relative orientation between the handheld device and the stylus from the local motion data and the stylus orientation data;
   determining motion of the handheld device relative to the stylus from the relative orientation; and
   in response to user input, selecting if a software application executed on the handheld device is to be controlled in response to an absolute motion of the handheld device or in response to the determined motion of the handheld device relative to the stylus.

2. The method of claim 1, where determining the handheld device orientation data comprises determining the handheld device orientation dependent upon signals from one or more of: an accelerometer, a gyroscope and a magnetic field sensor of the handheld device.

3. The method of claim 1, where determining motion of the handheld device relative to the stylus comprises:
   rotating the local motion data dependent upon the relative orientation between the handheld device and the stylus.

4. The method of claim 1, further comprising:
   controlling a software application executed on the handheld device in response to the motion of the handheld device relative to the stylus.

5. The method of claim 1, further comprising time-aligning the stylus orientation data and the handheld device orientation data.

6. The method of claim 1, further comprising:
   determining orientation of the handheld device relative to the stylus from the stylus orientation data and the handheld device orientation data.

7. A handheld device comprising:
   one or more sensors operable to provide sensor signals in response to motion or orientation of the handheld device;
   a communication module operable to receive stylus orientation data from a stylus, the stylus orientation data descriptive of an absolute orientation of the stylus; and
   a processor coupled to the one or more sensors and the communication module and operable to:
   determine handheld device orientation data, descriptive of an absolute orientation of the handheld device, from sensor signals;
   determine motion of the handheld device relative to the stylus from the stylus orientation data and the handheld device orientation data; and
   in response to user input, select if a software application executed on the handheld device is to be controlled in response to an absolute motion of the handheld device or in response to the determined motion of the handheld device relative to the stylus.

8. The handheld device of claim 7, where the processor is further operable to:
   determine orientation of the handheld device relative to the stylus from the stylus orientation data and the handheld device orientation data; and
   execute an application dependent upon the orientation of the handheld device relative to the stylus.

9. The handheld device of claim 7, where the one or more sensors comprise a tilt sensor, a magnetic field sensor, or a combination thereof.

10. The handheld device of claim 7, where the one or more sensors comprise an accelerometer, a gyroscope, or a combination thereof.

11. The handheld device of claim 7, where the processor is further operable to execute an application in response to an orientation of the handheld device relative to the orientation of the stylus.

12. The handheld device of claim 7, where the processor is further operable to execute an application in response to an orientation of the handheld device relative to an absolute frame of reference.

13. The handheld device of claim 7, where the processor is further operable to execute an application in response to a motion of the handheld device relative to an absolute frame of reference.

14. The handheld device of claim 7, further comprising a clock, where the handheld device is operable to time-align the stylus orientation data and the handheld device orientation data in response to a timing signal provided by the clock.

15. The handheld device of claim 7, where the handheld device comprises a tablet computer.

16. The handheld device of claim 7, where the handheld device comprises a mobile telephone.

17. A method executed on a handheld device, the method comprising:
   determining motion of the handheld device relative to a stylus, dependent upon:
   obtaining stylus orientation data descriptive of an orientation of the stylus and received through communication with the stylus;
   obtaining orientation data descriptive of an orientation of the handheld device;
   sensing local motion of the handheld device, the sensing generating local motion data descriptive of handheld device motion in a frame of reference of the handheld device; and
   calculating a relative orientation between the handheld device and the stylus from the local motion data and the stylus orientation data; and
   executing an application dependent upon the determined motion of the handheld device relative to the stylus.

18. The method of claim 17, further comprising executing an application dependent upon one or more of:
- an orientation of the handheld device relative to the orientation of the stylus;
- an orientation of the handheld device relative to an absolute frame of reference; and
- motion of the handheld device relative to the absolute frame of reference.

19. The method of claim 17, further comprising transmitting to a remote device a description of the motion of the handheld device relative to the stylus.

* * * * *